United States Patent [19]

Lanchais

[11] Patent Number: 4,857,840

[45] Date of Patent: Aug. 15, 1989

[54] INFORMATION AND GUIDING SYSTEM INCLUDING A PORTABLE RECEIVER DEVICE HAVING AN ELECTROMAGNETIC WAVE ANTENNA AND MAGNETIC FIELD SENSOR

[76] Inventor: Michel Lanchais, 42, terrasse de l'Iris, La Defense 2, F-92400 Courbevoie, France

[21] Appl. No.: 862,496

[22] PCT Filed: Jun. 18, 1985

[86] PCT No.: PCT/FR85/00160

§ 371 Date: Apr. 9, 1986

§ 102(e) Date: Apr. 9, 1986

[87] PCT Pub. No.: WO86/00419

PCT Pub. Date: Jan. 16, 1986

[30] Foreign Application Priority Data

Jun. 18, 1984 [FR] France ................................ 84 09474
Oct. 29, 1984 [FR] France ................................ 84 16478
Feb. 7, 1985 [FR] France ................................ 85 01686

[51] Int. Cl.[4] .......................... G01S 5/02; G01S 11/00; G01C 17/02; H04B 7/00

[52] U.S. Cl. ............................... 324/207; 33/355 R; 324/226; 324/260; 340/989; 342/457; 342/458; 364/460; 364/424.01

[58] Field of Search ............... 324/207, 208, 226, 260, 324/247; 340/988–993; 33/355 R, 361, 363 R; 342/450, 457, 458, 127, 146; 364/449, 452, 460, 424

[56] References Cited

U.S. PATENT DOCUMENTS

| | | | |
|---|---|---|---|
| 2,165,214 | 7/1939 | Blau et al. | 324/334 X |
| 3,098,225 | 7/1963 | Anderson . | |
| 3,333,270 | 7/1967 | Page . | |
| 3,553,699 | 1/1971 | Starkey et al. . | |
| 3,905,121 | 9/1975 | Takeda et al. | 33/361 |
| 3,961,166 | 6/1976 | Stobart | 340/991 X |
| 4,010,413 | 3/1977 | Daniel | 324/335 |
| 4,454,583 | 6/1984 | Schneiderhan et al. | 364/449 |

FOREIGN PATENT DOCUMENTS 2050767 1/1981 United Kingdom .
02271 7/1982 World Int. Prop. O. .

Primary Examiner—Gerard R. Strecker
Attorney, Agent, or Firm—Browdy and Neimark

[57] ABSTRACT

A portable device for communication is useable during movement by a person. Individual portable receivers (2), the size of a credit card, display and/or broadcast to a user, automatically or by selection, data coming via waves (3) coming from microwave or laser transmitters (1) and FM transmitters (4). The transmitters (1) can cover nerve zones such as population centers, and sequentially send a flow of data transmitted by a digital signal with for instance 900,000 bits/second. At the same time, the transmitters (4) are used to cover 95% of a territory in audio. This provides a service of public interest, allows changing the descriptive speech, provides a choice of messages, offers a presale service, and makes possible selective identification. The device also automatically pinpoints a position with a single transmitter and provides a target objective that is sought to be reached by the user, thus simultaneously meeting the requirements of urban, rural and interior location while being useable with all locomotion means.

16 Claims, 4 Drawing Sheets

INFORMATION AND GUIDING SYSTEM INCLUDING A PORTABLE RECEIVER DEVICE HAVING AN ELECTROMAGNETIC WAVE ANTENNA AND MAGNETIC FIELD SENSOR

BACKGROUND OF THE INVENTION

This invention belongs to the field of techniques grouped under the term telematics, i.e. techniques having as their object long-distance data transmission and processing.

Its preferred embodiments are described for applications of orientation, direction, identification, guidance and assistance. Generally, the invention broadens the horizon of communication and corresponds to needs such as:

matters in the public interest;
changes in descriptive speech for guide purposes;
a choice of messages such as provided from a memory;
advertising offered as a support service;
selective identification; and
a new combination with a compass which automatically "pinpoints" one's location.

This invention simultaneously meets such requirements in urban, rural and interior locations, and is used with all locomotion means in all atmospheric media. The invention also provides an improved aid to driving and road safety, as a medium for directional etc., information. It optimizes use of road and highway systems since it can improve relationships between public services, government and the user. As a personal guide device, it can indicate the direction and distance to find a given location, a street, a business, a service, a hotel, assistance, a meeting, a demonstration, a show, a job or leisure activities. Also, it can guide a user to a business, such as at the back of an industrial zone, an automatic bank in service, an open gas station, a stand in the labyrinth of an exhibition, an office in the three dimensional maze of a new town, etc. It can also serve as a "regional memory" during movement of a user and when it is of interest it can obtain sports results, local news, and weather report, tips, etc. Also, it can report on road obstructions on a traveller's itinerary and how to get around them. As advertising support it can give the best price of a desired product and lead a user to the nearest sales point, while it describes to best advantage of the advertiser the area passed through by the user and guides the user as to its specialities. As a tool for a professional, it can classify and provide the possibility of finding merchandise under the best conditions. It also is able to analyze values, by using telemetry, with telediagnostics, etc. As a new type of compass at this dawning 21st century, it wirelessly connects the individual to his surroundings, the surrounds to the individual, and individuals to one another. The above features are made more clearly in the following, including in the description of specific embodiments.

To date there have been various systems of orientation, guidance, signaling and recognition, whether static, mechanical or electronic, none is comparable to this invention.

Actually, the invention uses propagation of electromagnetic radiation between a transmitter and a receiver with various complementary measurement and transmission processes, including: a unidirectional transmission of digitized data with a periodic movement of carrier frequency which allows the function of telemetry by phase scattering while transmitting the digitized data as desired; a new thin-layer compass which determines the direction of the earth's magnetic field and provides an orientation function; and a standardized frequency modulation transmission employing known means of the prior art.

U-band microwave transmitters are installed at sites suitably selected to cover well-determined nerve zones of a population. These transmitters sequentially send out recordings from a data base. Such data flow can be transmitted by a digital signal with a speed equal to about 900,000 bits/second, for example.

Also, a plurality or network of frequency modulation transmitters can be installed to cover for instance 95% of a territory. These transmitters traditionally broadcast in FM. For a national territory, the existing public and/or private networks coul be used by controlling periodicity of priority transmission.

Individual portable electronic receivers the size of a credit card are used by the users. They display on their screens and can be made to broadcast through their speakers, for instance automatically, public service announcements such as these dealing with traffic and road safety. This data comes either from a nearby sequential transmitter or from a local FM transmitter as validated by the receiver when either of those transmits data to assist driving.

The data is programmed for directional, administrative, professional, commercial, tourist, cultural, sports data, data on leisure activities, etc. Again, this data comes either from the nearby sequential transmitter or from the local FM transmitters as validated by the receiver when either of these transmits the required data.

The receiver needs only a single transmitting source to determine the local cartography and to "pinpoint a position." It has no outside antenna and weighs less than 100 grams. The receiver selects data which can prove vital for all users for a professional category, or also for a single individual, without disturbing others.

This data is, according to preference, very extensive if specific applications are sought, or limited by automatic selection of public service data or by preprogramming of priority data for the one who desires absolutely no manipulation.

The receiver is independent, but it can be connected to the car radio, to an on-board computer, to the digital counter of a vehicle and to most data processing equipment.

This invention also leads to a multitude of applications connected with the circulation of people in the interior of a building, or with coastal navigation, or with railway traffic, etc.

The invention easily supplements a simultaneous public service, from a commercial and professional perspective, as in the following manner. A first objective of this new compass has as its object to improve road safety, and to provide an aid to driving and to the relationship between public services, government and citizen-users. A second objective of this new medium aims to create a new promotional, advertising and commercial support which in particular provides "pre-sale service". A third objective of this new means of communication is to make a new professional tool capable of use in particular with telemetry, teleclassification and telediagnostics.

The realization of these three objectives according to the present invention makes possible: with government, the establishment of a national network which develops as a basis of standardization a system employing the device of the present invention; with advertising, the paying off of initial expenses for the system employing the device of the present invention, and financing the maintenance of the transmitters; mass production due to the entirely achievable interdependence of the various sectors of application of the present invention; and moreover development of a chromatic language to establish a dialogue between the user and the device of the present invention, namely an interaction language that can be used in all languages.

The main operating device of the invention is based on the use of a pulse-code modulated (PCM) unidirectional connection, using a frequency that permits the telemetry (distance determination) function, and on a system which determines the direction of the magnetic field of the earth.

Traditionally, the known purposes using the propagation of electromagnetic radiation are of two types. A first type of telecommunications systems are known in which an electromagnetic radiation beam, modulated according to a standardized process (AM, FM, SSB, PM, FSK, PSK, etc.) serves as vector with a series of data, transmitted from the transmitting source to the receiver(s). This vector indicates to the receiver the direction from which the transmission originated. According to a variation of this type, two or more different modulation processes can be applied to the same radiation beam to transmit simultaneously several independent sequences of data. Further diagnostic systems are known in which an electromagnetic radiation beam going through a medium or being emitted via a substrate, the medium or substrate being subjected to the diagnostics, is analyzed by a measuring system, which makes it possible to deduce one or more physical characteristics of the medium or substrate.

The diagnostic function necessitates the comparison of the energy spectrum (amplitude A and phase (phi) as a function of the wavelength (lambda) received by the receiver with the reference spectrum emitted by the source, which is known.

At a time t, the complex amplitude of the wave received by the receiver is:

$$A(t) = \int_{w=0}^{w=\infty} A(w)\, e^{iwt} e^{i\phi(w)} dw$$

Because of the different propagation speeds of different pulse components, a wide-band means, i.e. whose spectrum extends over a wide angular frequency (omega), is not usually used in telecommunication, but only in close diagnostics.

This invention uses phase scattering of an electromagnetic radiation beam going through a material medium which can be the earth's atmosphere separating the transmitter from the receiver, or a substrate separating a radiation applicator from the receiver, or information on the material of the substrate itself can be determined from such phase information if said substrate constitutes the transmitter. According to the prior art, the absorption, i.e., the amplitude attenuation, of an electromagnetic wave beam through the atmosphere has been used for instance for:

1. measuring concentration of water vapor of the upper atmosphere; and
2. confidentializing of short-range radiotelephony by using absorption by the 3-rho-sigma absorption band of oxygen in the U-band (60 GHz) to limit the possibilities of interception of message outside the beam.

SUMMARY OF THE INVENTION

According to this invention, the differential absorption of the radiation at at least two different frequencies of the spectrum of the transmitting source, and/or the phase scattering of the composite signal transmitted by the transmitting source, is used and analyzed by each of the receivers to measure at least a characteristic of the medium passed through, such as its absorption depth, which in the present case allows determining distance separating each of the receivers from the transmitting source.

Because the radiation transmitted by the source must be partially absorbed and/or scattered by the atmosphere that it goes through, the frequency of the transmitting source should be selected from one of the following frequency bands: the triplet 3-rho-sigma absorption band of oxygen (at 60±6 Ghz) U-band; infrared and red absorption bands of oxygen at 6.426, 0.688 microns; and absorption bands in the ultraviolet of oxygen and of nitrogen of 0.45 to 0.204 microns.

Among the sources of usable radiation as transmitters are microwave oscillators with a Gunn diode, Impatt diode, travelling wave tube or excimer laser, such as an argon fluoride (ArF) laser transmitting at 0.193 microns.

The transmitting source is modulated according to one of the processes known to be suitable for the transmission of a flow of sequential data in digital form, representing, for example the cartography of the geographic location of the transmitter in the reception region in which the user with the receiver is moving.

An angular data is available at the receiver to make it possible for it to locate itself in relation to an absolute geographic reference frame. This can be achieved in two separate and possibly complementary ways. The first involves coding into the radiated beam itself the angle of the rotation that each reflection, for instance by a rotating mirror, imposes on the beam. This requires the use of a rectilinearly or circularly polarized beam and a mirror whose surface structure is anisotropic with respect to the the electromagnetic wave that it reflects. The second way involves determination of the receiver of its own angular orientation in relation to the earth's magnetic field, by means for instance of a new thin-layer magnetoelectronic compass.

This invention involves a system for transmission and reception of data by electromagnetic waves (3), of the type comprising at least a microwave or laser transmitter (1) and at least a portable individual receiver (2), and its application mainly to the fields of communication, orientation, telemetry, coding, programming and advertising. The invention is generally characterized in that the system principally uses a wide-band beam, in that the transmitting frequency of said transmitter (1) varies over a certain frequency range, covering at least partially an absorption band of the earth's atmosphere, and in that the differential absorption, of the radiation at at least two different frequencies of the spectrum of the transmitting source and/or the phase scattering of the composite signal transmitted by the transmitting source, is used and analyzed by the receiver (2) to determine a quantitative characteristic of the medium passed through, which can be the Earth's atmosphere or a substrate separating the source of the radiation from the receiver, or the material of the substrate itself if said substrate constitutes a transmitter, and, for the second embodiment in the preceding paragraph, in that the receiver (2) takes into account the earth's magnetic field. It results from the arrangements of this embodiment: that through this analysis the receiver (2) effectively measures the distance L separating it from the transmitter (1); and that the receiver (2) pinpoints its own position using a single one of the transmitters (1) as a function of this distance measurement and a determination of the direction of the earth's magnetic field.

According to another aspect of the invention, the measurement of the direction of the earth's magnetic field constitutes one of n measurements necessary for the receiver to determine its position in a space having n dimensions (n being equal to two for movement on the surface of the earth). The receiver (2) determines such components by means of a thin-layer microelectronic device (19), made for instance to have Hall-effect generators (30).

It results from these arrangements that the receiver (2) determines its exact geographic position on the surface of the Earth with these two measurements.

According to another aspect of this invention, the receiver (2) comprises, for collecting the waves transmitted by the at least one transmitting electromagnetic source (3), a dielectric lens antenna (8) suited to the wavelength of said electromagnetic wave (3) on a semiconductor (11). The dielectric lens antenna (8) is suited to the wavelength of said electromagnetic source (3), which lens focuses the incident electromagnetic wave (3) on a semiconductor detector (11). The dielectric lens antenna (8) is selective for each respective frequency being transmitted by the interposition, either of an interference filter, or of a resonant line (10) which is of the trapped, inverted microstrip type, to obtain the highest potential of the received signal. It results from these arrangements that the receiver (2) has no prominent antenna and that it can be constituted as without an outside antenna, even on board a vehicle.

According to another aspect of this invention, said electromagnetic waves are transmitted in the form of pulse-code modulated wave trains, and said receiver (2) comprises digital type means to process and display the data received. The receiver (2) also comprises analog type means accomplishing the telemetric function and an analog-to-digital converter (15) for digitizing the telemetric signal, which enables it to locate itself in relation to the transmitter (1).

It results from these arrangements that said receiver (2) can calculate the distance L separating it from the transmitter (1) and can also display this distance, in association with the angular determination based on the magnetic field or the direction of transmission from the transmitter, in the new measuring instrument according to the present invention.

According to another aspect of this invention, the digital computer of the receiver determines, telemetric data sent out (with the pulse-code modulated binary data) and received and digitized by the analog converter (15) and the electronic signals provided by the four-pole sensor (19) (which has 2 reference axes X and Y in the plane of flat (2)), the exact distance from the transmitter angle between the north/south axis of the earth's magnetic field and the axes of the receiver (2). In other words, the four-pole sensor (19) is arranged in the flat receiver (2) shown in the drawings so that, when this flat receiver (2) is held for instance horizontally, the sensor (19) detects the two respective horizontal components of the magnetic field.

It results from these arrangements that the receiver (2) also displays a stored directional signal (31) which is readjusted during movement toward a site, a dwelling, or an object that is being looked for and possibly described to the user by the receiver based on the transmitted information. This site, object being searched for, etc. is other than the transmitter (1), and the receiver (2) likewise constantly gives the direction in which the user with the receiver should head in. Thus a new compass is involved.

According to another aspect of this invention, a system for transmission and reception of data by means of electromagnetic waves (3) comprises at least two different wave transmitters (1) and (4) shown with dotted lines in FIG. 1 and at least a portable individual receiver (2), and its application to the fields of communication, orientation, telemetry and advertising. "The system uses principally a wide-band beam for the distance determination at least from the first transmitter (1), and in that it also uses an electromagnetic radiation beam for receiving information for the user according to the standardized frequency modulation process. Said receiver comprises digital type, analog type and microwave type means to process, display and/or broadcast the data received for the user's benefit.

It results from these arrangements that the receiver which selects at the same time data coming from two transmitting sources of different types, such as digitized microwave or laser sources or by frequency modulation, displays them on its screen and broadcasts them by its speaker, is a new device and provides effectively a new system or medium for such aids to a user carrying the receiver of the present invention.

According to another aspect of this invention, the receiver (2) is provided with a plurality of keys (23+24) making it possible for the user to select, from a plurality of programs, a program for processing the data received. The keys can be colorimetric, or alphabetic, or numeric, or symbolic, or may simultaneously partially or wholly combine these qualities. These features as incorporated in the present invention will generally depend on the nature of the transmitting sources, on the type of transmission, and on the creative will of the user.

It results from these arrangements that the keys can, according to the mnemonic techniques and/or vectorial tactile norms and/or preestablished codings according to standards as might be adopted from known techniques, represent letters or words, figures or numbers, musical notes or chords, symbols or formulas, as well as objects, properties, relations, conditions, actions, events, scenarios, inferences, data processing languages, and also cardinal points. A displayed or broadcast piece of data can thus be selected from a plurality of possible pieces of data.

According to another aspect of this invention, the receiver can also be made for a particular limited purpose, for instance so as to have no apparent programming or function key.

It results from this arrangement that the receiver (2) is preprogrammed for one or more such specific purposes, and that the receiver (2) also can be used such as for a compass, but with an advertising image displayed instead of any writing caused by the user operating the keys.

According to another aspect of this invention, the receiver (2) is a portable individual card using microelectronic means with optical, magnetic and color features to pinpoint a position by programming or preprogramming.

It results from these arrangements that with with this "new compass" one can direct oneself in a precise manner, on foot or aboard a vehicle, without signaling panels, to a determined objective or objectives, by displaying on its screen directional signals and alphanumeric data and by broadcasting by its speaker data according to programmed or preprogrammed objective(s).

According to another aspect of this invention, the receiver (2) is a portable individual card using microelectronic means with optical, magnetic, and color features to select data during one's movement.

It results from these arrangements that with such a new medium there can be received, during such movements, either automatically public service announcements such as road safety messages or various data at a time when desired, for instance by programming the receiver.

According to another aspect of this invention, it is characterized in that the receiver (2) is a portable individual card using micro-electronic, etc. means to receive preselected data during one's movement.

It results from these arrangements that, with this new medium, public service announcements as well as various preprogrammed data can be received during one's movements automatically and without manipulation of the system.

These objectives and others, as well as the features and advantages of this invention, are the object in the following description of practical embodiments given by way of examples, in correlation with the attached drawings.

DESCRIPTION OF PREFERRED EMBODIMENTS

An embodiment of the receiver of the present invention for determining distance from the transmitter using the magnetic dipolar absorption of oxygen at 62.4 Ghz will be discussed below.

Figure 3:
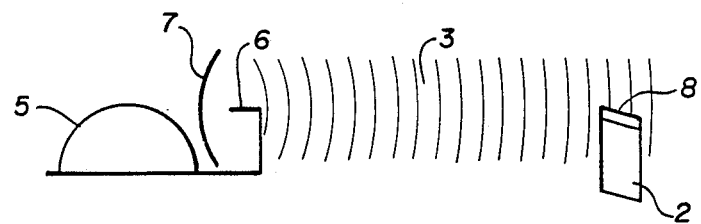
FIG. 3 is a diagram of an embodiment of the invention with a Gunn or Impatt transmitter (5) where the connection by direct radiation by horn 6 in FIG. 3 at the focal point of a parabolic reflector (7) of the beam (3) reaches the diopter or dielectric antenna (8) of the receiver (2).

The transmitter (1) according to FIG. 3 uses a Gunn or Impatt oscillator (5), with for instance 30 effective mW, in the U-band. PCM modulation (max. data 10 Mbits/sec, expandable) is managed by a microcomputer with a 10 Mhz clock frequency (indicated by block (17) in the receiver (2) of FIG. 5) and FSK by frequency shifting (+150 Mhz). The microcomputer 17 can be simple in structure because of being limited to a sequential transmission of preprogrammed data; a memory capacity of 16 kilobytes is sufficient for sequential transmission of a data file of 600 sites with their geographic location. The telemetric FSK transmission does not alter the PCM data.

Connection by waveguide or direct radiation by horn (6) can be made to the focal point of a parabolic reflector (7) located for instance under a plastic radome.

Figure 1:
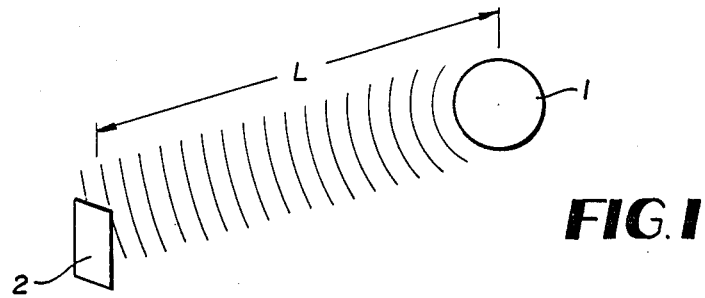
FIG. 1 is a diagram showing an embodiment of the invention in which a receiver (2) measures the distance L separating it from a sequential and digital transmitting source (1).
Figure 2:
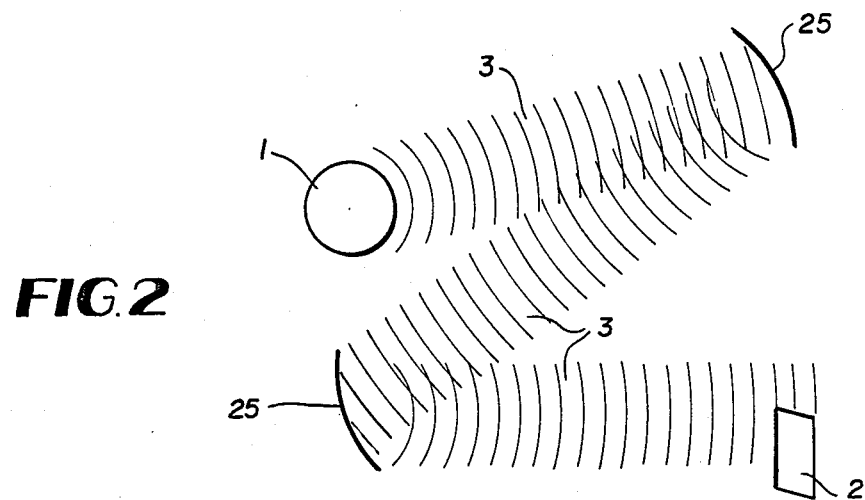
FIG. 2 is a diagram showing an embodiment of the invention in the most general case where the sites of exploitability of the signal transmitted by this transmitting source (1) are not aligned. The beam (3) is reflected by mirrors (25) to the receiver (2).

Propagation of the beam is in a straight line, with any returns by slightly concave mirrors (25) as in FIG. 2.

Figures 4, 5:
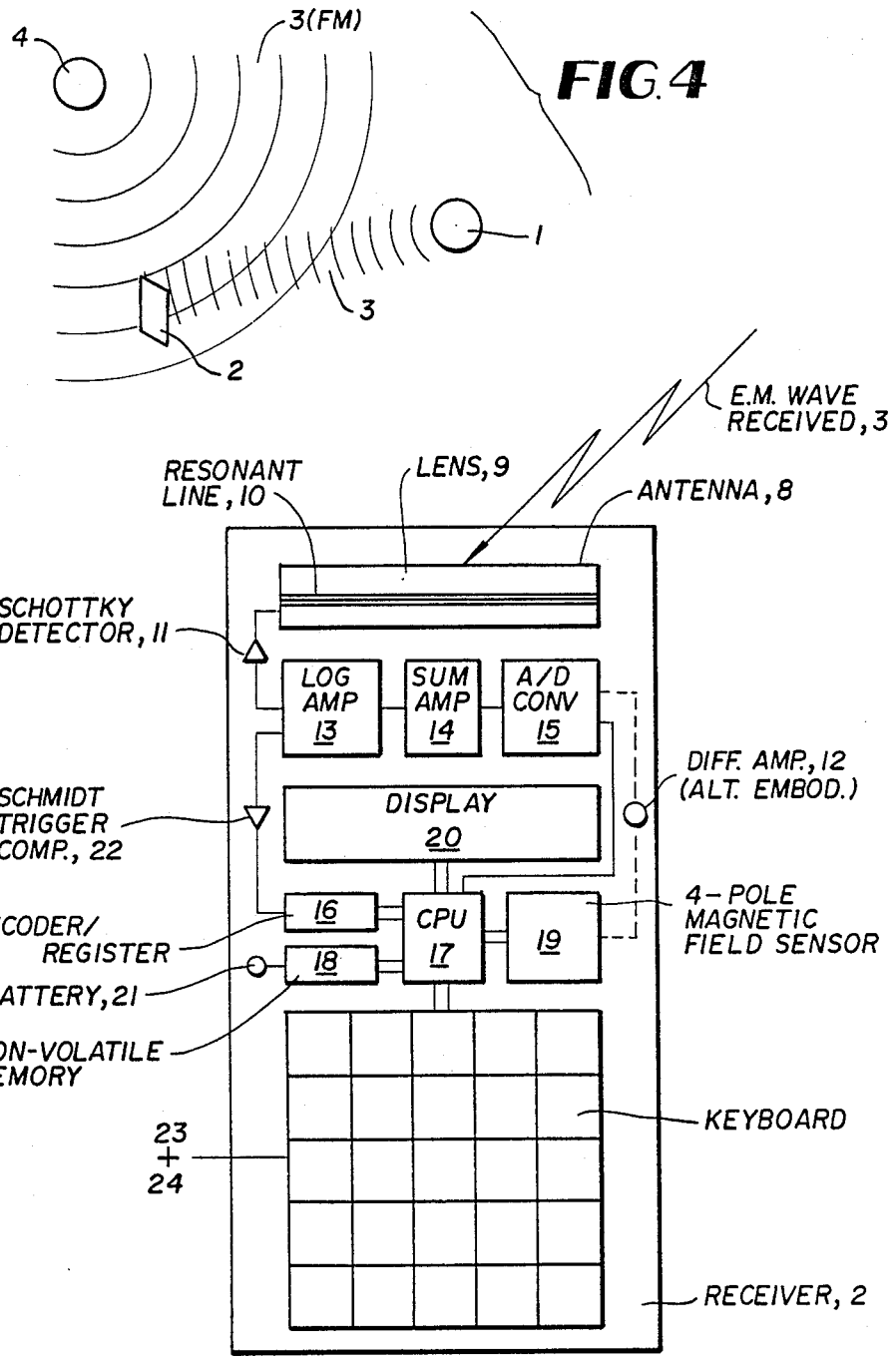
FIG. 4 is a diagram showing an embodiment of this invention in the case of a receiver (2) simultaneously receiving two separate transmission, namely a wave (3) coming from a microwave or laser transmitter (1) and a wave (3) coming from an FM transmitter (4).
FIG. 5 is a diagram of the receiver (2) with its various components.

An embodiment of the receiver (2) is now described according to FIG. 5. Only the reception head needs to be changed for optional use of a laser for transmitting the signal to the receiver, such as to provide directional vector data. The dielectric antenna (8) functions as a waveguide-Fresnel lens and concentrates the electromagnetic radiation (3) intercepted on its surface on a U-band resonating gold/copper microstrip line (10), with detection by a Schottky diode (11) (60/75 Ghz diode) connected to the input of a logarithmic amplifier (13).

The dioper or dieletric antenna (8) includes the lens (9), the microstrip (10) and the dielectric diode (11). The output of the diode (11) can be provided to a differential amplifier (not shown), and from there to a logarithmic amplifier (13). Also shown are a summing amplifier (14), an analog-to-digital converter (15), a decoder (16), a microprocessor (17) equipped with a nonvolatile memory (18), the magnetic direction sensor (19), the LCD display (20), the safety battery (21), the trigger comparator (22), and the keyboard (23+24).

A first output of the amplifier (13), consisting of variable amplitude pulse trains, namely, the PCm data supplied by the transmitter (1) from which the user holding the receiver (2) selects particular information for storage, is connected on one hand to the Schmidt trigger comparator (22) and from there to the decoder (or shift register) (16), and the decoder (16) is connected according to known means of the prior art to the digital logic processing unit (17) having for instance an Si PROM memory (18). The decoder (or shift register) (16) is controlled by the clock of the CPU 17 and is synchronized on the FSK pulses, the acquisition of data being asynchronous.

On the other hand, another output of the amplifier (13) is connected to an FSK demodulator, composed of a sample and hold circuit (not shown), a summing amplifier (14) and a A-D converter (15). An output of the A-D converter (15) is connected to the CPU (17). The receiver (2) includes the keyboard (23+24) and an LCD display (20).

Extraction of the telemetric data involves solving the equation $V_{tel} = 2.34\ V_r e^L$, where $V_r$ is the amplitude of a binary element of data coming out of the logarithmic amplifier (13) (i.e., whose output voltage is proportional to the logarithm of the voltage input to the logarithmic amplifier (13).

Extraction of the telemetric data involves solving the equation $V_{tel} = 2.34\ V_r e^L$, where $V_r$ is the amplitude of a binary element of data coming out of the logarithmic amplifier (13) (i.e., whose output voltage is proportional to the logarithm of the voltage input to the logarithmic amplifier (13)).

Coming out of the logarithmic amplifier (13), the decoder (16), controlled by an automatic threaded adjustment comparator (22), shunts the $V_{tel}$ FSK pulses to an analogue counter (op ampli) (not shown) for input to the microprocessor (17) as indicated.

Then, $L = \ln V_{tel} - \ln V_r - \ln 2.34$.

The electric signal (voltage or current) proportional to L is converted into a digital number for example by an A/D converter such as converter (15), supplied by instance by I²L technology, or for instance by an algorithm for counting integration time under control of the CPU.

Extraction of the directional data involves solving the equation for theta $$\theta = \arctan(Vy/Vx)$$

as a function of the magnetic field components Vx, Vy along the two reference axes X and Y as detected by the four-pole detector (19), namely in relation to the north/south axis of the earth's magnetic field and to the receiver's own sensing axes for the magnetic field (namely the x and y axes of the detector (19)).

Then, the CPU (17) computes the distance from the transmitter, and the relative direction of the desired site whose coordinates have been extracted by the demodulation in the receiver (2) from the train of pulses passing in the shift register of the receiver (2). Among other things, the receiver comprises a resonant line of the trapped inverted microstrip type (10), itself coupled to a Schottky detector (11). In the case of using an ArF laser transmitter, the resonant antenna would involve a fluorescent dielectric diopter coupled with at least a photodiode.

The following elements of the structure of the receiver, as in FIG. 5, are independent of the nature of the radiation transmitted by the source: the logarithmic amplifier (13); the summing amplifier (14) and AD converter (15); the PCD decoder (16); and the CPU microprocessor (17) equipped with a nonvolatile RAM memory (18) (either of the CMOS type with backup battery, or of the EAROM type, or of the magnetic bubble type). The CPU microprocessor (17) receives the sequential data of the PCD decoder (16), the telemetric data of the AD converter (15), the program of the user of the keyboard (in the case of programmable cards) and controls the liquid crystal display LCD (20).

The active circuits are installed in the form of "chips" or in the form of micropackages on a printed circuit, whose lower face comprises a group of silicon photovoltaic cells providing the power supply for the unit. In the case of using RAMCMOS, a backup battery (21) (lithium, mercury or silver oxide) is provided within the thickness of the circuit. The LCD display (20) and the keyboard (23+24) are installed on the side of the active circuits and connected by soldering or a strip of conductive elastomer. For angular guiding by a thin-layer magnetoelectronic compass, the detector (19) of the direction of the magnetic field is connected to the analog-to-digital converter ADC (15) using a differential amplifier (12).

The design of the diopter depends on the transmitting source (3) that is used. In the case of a laser source, its function is that of a semicylindrical of Fresnel lens (9) which concentrates the light received on one or more photodiodes (11) added to the circuit.

Figure 6:
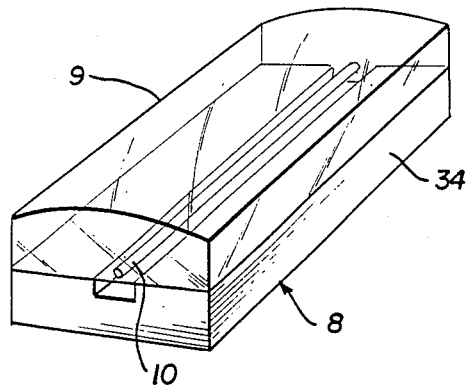
FIG. 6 is a diagram in perspective of the diopter (8) which is a dielectric antenna composed of a semicylindrical or elliptical-shaped TPX or polyethylene lens (9), a gold/copper, resonant, trapped, inverted microstrip (10), and a metal case (34).
Figure 7:
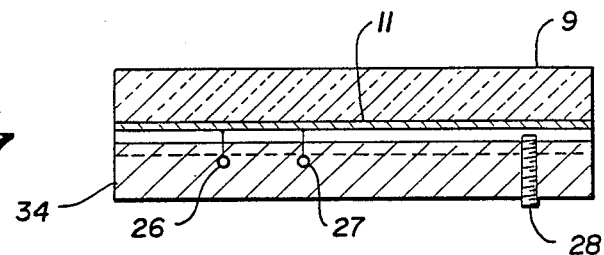
FIG. 7 is a longitudinal section of said diopter (8) with the return connection (26), the output connection (27), the gallium arsenide detection diode (11), and the tuning screw (28).

In the case of using a microwave band source, its role is more complex since it simultaneously constitutes a dielectric lens (9) and a dielectric resonator resonating in the U-band with the suspended line (10) formed by cathode sputtering, and completed with a gallium arsenide Schottky diode (11). The groove metal part (34) as indicated in FIGS. 6 and 7 is added to the pritned circuit. A tuning screw (28) is also included as indicated in FIG. 7. The entire unit constitutes a trapped inverted microstrip resonator.

Figure 8:
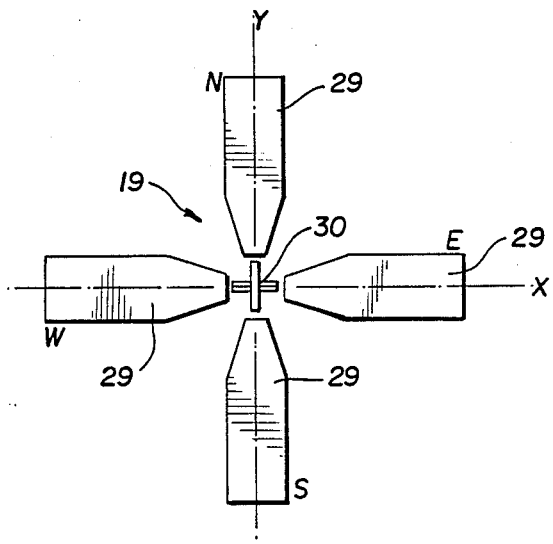
FIG. 8 is a diagram seen from about of the magnetic direction sensor (19) with the anisotropic ferrite pole pieces (29) and the Hall effect four-pole magnetodiodes (30).
Figure 9:
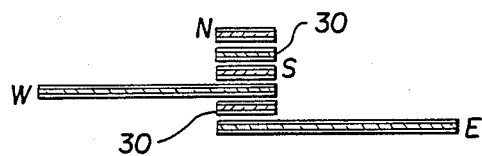
FIG. 9 is a longitudinal section of said magnetic direction sensor.

FIG. 8 indicates a top view of the magnetic direction sensor (19), for determining the components of the magnetic field along the x and y axes by means of the pole pieces 29 and the magnetodiodes (30). The sectional view along one of these axes is indicated in FIG. 9. Embodiments satisfying various ergonomic features are indicated according to FIGS. 10, 11, 12 and 13.

The previously described feasibilities and others of this invention can be provided a number of different ways and have a multitude of appliations. This is the object of the following description of the illustrated ergonomic embodiments of the invention given by way of example only, in correlation with the accompanying drawings.

The individual portable receivers have exterior dimensions on the order of about ten centimeters long, about a halfdozen centimeters wide and a few millimeters thick.

Figure 10:
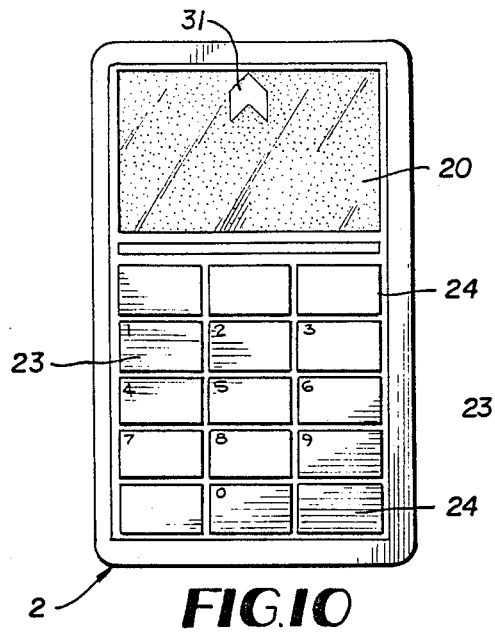
FIG. 10 shows a programmable card-sized receiver according to the present invention.
Figure 13:
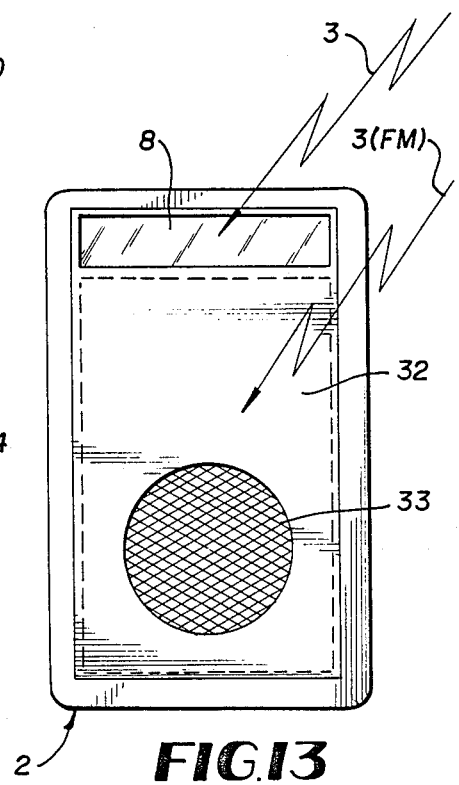
FIG. 13 shows an embodiment of the back of any of the receivers, with a speaker and the antenna diopter for receiving the signal transmitted from a transmitter.

FIG. 10 shows a "standard" programmable card version of the receiver (2) with an 86×54 mm size. On the front is provided an LCD display (20) with a mobile directional symbol (31), a keyboard equipped with sensitive programming keys (23) and function keys (24). FIG. 13 illustrates the back.

The small bulk of the receiver makes it easy to handle and gives it good storage compatibility with cards presently on the market. The main users would be tourists, travellers, motorists, residents, consumers, etc.

Figure 11:
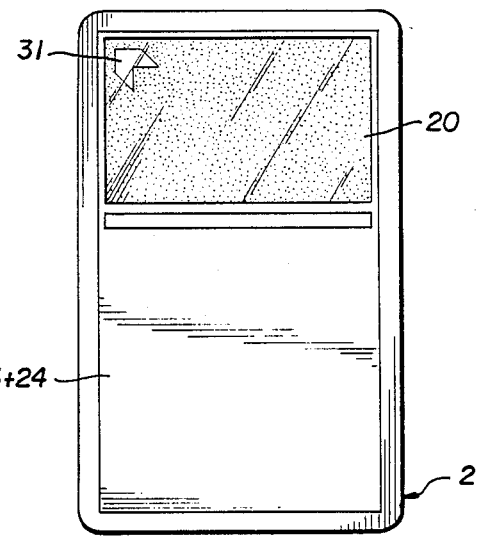
FIG. 11 shows an embodiment of a receiver of the present invention which is preprogrammed to perform a specific function and to provide a corresponding display, this embodiment not having any keyboard.

FIG. 11 shows a "standard" or prreprogrammed card version of the receiver (2) with an 86×54 mm size. On the front is provided an LCD display (20) with a mobile directional symbol (31). This embodiment has no function or programming key. It is preprogrammed for one purpose or several identical purposes. It is used without manipulation, with for instance an advertising image instead of the writing of the keyboard (23+24). The back is also as shown in FIG. 13.

Figure 12:
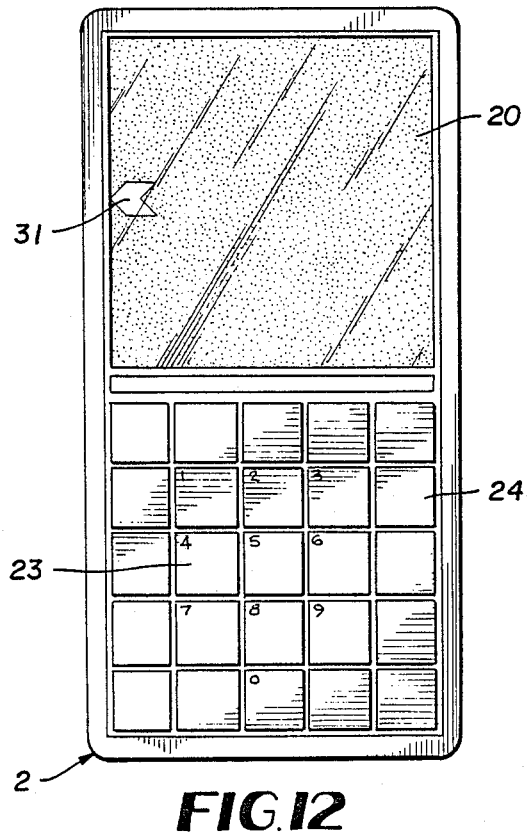
FIG. 12 shows an embodiment having a keyboard and a larger display.

FIG. 12 shows a "business" card version of the receiver (2), its larger 125×65 mm size (which dimensions are reversible for the particular applications while still being pocket-sized) giving it a larger screen for professional use. On the front there is an LCD display (20) on which letters, numbers and/or directional signals (31) can appear. In the lower part, a space can be reserved for the display of the manipulations. Reprogrammable sensitive keys can be provided on which colors and/or operational indicators can be provided to appear, such keys including programming keys (23) or function keys (24). The set of keys can also be provided so as to form a sensitive surface which permits a "finger writing" function, to draw characters and words with a finger.

FIG. 13 shows an example of the back of any of the disclosed group of cards. The diopter (8) has the function of collecting the wave coming from the digital sequential transmitter. The FM receiver (32) has the function of collecting the wave coming from the FM transmitter (for example, between 104-108 MHz). The speaker (33) broadcasts the transmissions in frequency modulation.

The color for the display can be selected according to convention, not only geographic, but also within each specialty for which the device might be used. Actually, although certain colors symbolize the elements, i.e. red=fire, green=the plant kingdom, and water, they also symbolize space, i.e. blue=the vertical dimension, are=the horizontal dimension, grey=the center of this space.

Generally black symbolizes time and white timelessness, therefore the receiver display can be provided so that the location of the user is shown in grey in the center of a chromatic field of the display, between various pairs of colors which might be formed "opposite" colors corresponding to respective "opposite" directions, such as yellow and blue, red and green, white and black, etc.

According to a first practical and ergonomic aspect of this invention, the manipulation process to establish dialogue between a receiver and its user comes from a syllogism combining a chromatic (color-coded) operational chart (Charts A1 to A4 below) appearing on the receiver and the sensitivity of the user, to devise and then use a new language suited for discerning selective orientation, data and classification.

This is generally characterized in that the receiver has a flexible keyboard equipped with sensitive keys (23=24) and that on these keys appear, for example the seven primary colors, VIOLET, dark BLUE (indigo), CYAN (light blue), GREEN, YELLOW, ORANGE, and RED as well as BLACK, GREY and WHITE.

It results from these arrangements that by defining statements dependent on coloring as well as tactile norms, on, from and to a colorimetric stationary reference number or numbers, a new declarative abstract language is obtained to orient oneself, inform oneself and classify one's surroundings, etc. This is equivalent to designing an expert vectorial minisystem.

According to this manipulation process, a new language pertaining to coding is worked out, then used.

This is characterized in that the basic operational chart takes into account an organization of colors and natural order of numbers by giving for example the following operational Chart No. A1.

| MAGENTA - 1 | BLUE - 2 | CYAN - 3 |
|---|---|---|
| RED - 4 | GREY - 5 | GREEN - 6 |
| ORANGE - 7 | YELLOW - 8 | WHITE - 9 |
|  | BLACK - 0 |  |

It results from these arrangements that colorimetric and/or numeric names (in black and white) can be made by combining tints and thus coding data able to be received and interpreted by the receiver as well as by the user. The keys of the telephone and of the videotex could have the same colors.

The manipulation process also uses the symbolism of the colors of the basic operational Chart A1 for orientation.

This is characterized in that the four cardinal points are represented by the four fundamental tints: BLUE and YELLOW, RED and GREEN, opposite colors whose center is GREY points opposite the other colors (except black). The application of this process provides the following operational chart No. A2:

| NORTHWEST | NORTH HIGH | NORTH EAST |
|---|---|---|
| (MAGENTA - 1) | (BLUE - 2) | (CYAN - 3) |
| WEST LEFT | CENTER | EAST RIGHT |
| (RED - 4) | (GREY - 5) | (GREEN - 6) |
| SOUTHWEST | SOUTH LOW | SOUTHEAST |
| (ORANGE - 7) | (YELLOW - 8) | (WHITE - 9) |

It results from these arrangements that the receiver has a compass function with nine areas, the four cardinal points, the four intermediate directions therebetween and the center (the latter depending on the case: the town center of activity, the center of interest, the center of attraction, the center of activity, the center of one's preoccupations, "the self"). On the inside, the four cardinal points can be used to signify high, low, left and right.

The manipulation process and its applications to chromatic programming is characterized in that it takes into account the activities and in some cases states of mind of the user.

The types of manipulations of the basic operational chart are referred to as divergent and convergent. An example of a divergent type of operational chart is the following Chart No. A3:

| DEPARTURE | LODGING | LEISURE ACTIVITY |
|---|---|---|
| (MAGENTA - 1) | (BLUE - 2) | (CYAN - 3) |
| SHELL-RENT | MAN | WANT |
| (RED - 4) | (GREY - 5) | (GREEN - 6) |
| PRODUCT | REACH | OBJECTIVE |
| (ORANGE - 7) | (YELLOW - 8) | (WHITE - 9) |

It results from the arrangement of operational Chart No. A3 that first pressing the GREY key, labelled "MAN" and indicating for instance "me", "I want", triggers a deliberate intention. Several practical ways are possible for continuing to input what is desired, the peripheral colors being either the representation of the pattern of action, or of deliberation on the part of the user. An example of convergent manipulation is shown by the following operational Chart No. A4:

| DEPARTURE | LODGING | LEISURE ACTIVITY |
| (MAGENTA - 1) | (BLUE - 2) | (CYAN - 3) |
| ASSISTANCE | MAN | ADVICE |
| (RED - 4) | (GREY - 5) | (GREEN - 6) |
| JOB | RESTAURANTS | ARRIVAL |
| (ORANGE - 7) | (YELLOW - 8) | (WHITE - 9) |

It results from the arrangement of operational Chart No. A4 that a sense of focusing of the peripheral colors toward the center GREY provides eight manipulations that can be carried out going from the intention or the desire of the surrounding context represented by the colored keys to "the self" represented by the center GREY key labelled "MAN".

According to another aspect of the invention, a reprogramming of the keys of the operational chart is characterized by the fact that it can be performed as a result of the transmission received by the receiver carried by the user.

Consequently, the redistribution of the statements according to colors can, depending on the needs, provide and correspond to letters or words, figures or numbers, musical notes or chords, symbols or formulas, as well as to objects, properties, relations, states, actions events, scenarios, inferences, schedules, etc.

It also results than an adaptation of the system for chromatic definitions of respective objects in various businesses participates then in the same way as other functions (data processing, administration, production, standardization, communication, circulation, etc.) in the creation or in the complementing of an automated overall management system.

The colorimetric and/or numeric designations could be displayed along with traditional notice of the block panels or tables of the subject matter to which any particular embodiment of the invention is directed, i.e. they could appear on maps, guidebooks, phone directories, files, etc., as well as on catalogs, messages and advertising spots for products. Such designations could be made on the basis of mnemonic and classification references.

Since these colorimetric designations can also take into account existing chromatic codings, a standardized classification would organize the group of services desired by the users of the invention. A basic coding planned on the national level could give the same colors to each city hall, to each pharmacy, etc.

A basic chromatic standardization planned on a larger scale would, without the barrier of languages, make it possible for each individual in any country to find routes, places, lodging, restaurants, services, businesses, correspondents, etc. Private locations, covered or closed such as to limit transmission, can use combinations of colors according to their own criteria.

The basic colorimetric operational chart is, in some ways, a chromatic menu and the statements which have been assigned to it can be defined for a directional and data purpose for tourists, motorists, consumers and residents.

Although particular purposes have been described and particular embodiments of a system for transmission and reception of data according to the invention have been shown, it should be understood that this invention is in no way limited to these embodiments and to these purposes.

Thus, this transmission and reception system includes not only directional, data and classifying functions but also the performing of diagnostics. This is characterized in that the differential absorption of the electromagnetic radiation in the U-band can also be used to detect an anomaly of the presence of oxygen such as by percolation into the region between the transmitter and receiver. Hence it results that the receiver and the transmitter form what might be termed an applicator (comprising parts 2, 5, 6 and 7) in the U-band. If involving transmission through the body of a living being irradiated by said applicator, it allows diagnosing an anomaly of percolation of oxygen, a clinical symptom of a cancerous tumor or of a pulmonary oedema.

Also in the directional case, it is also prospective, i.e. that the purpose to be reached as a function of established criteria is not essentially geographic but also physical.

Covered further by the invention is a system for data transmission of said type in which the data vectorial waves are either light of the laser type, or electromagnetic of the microwave and frequency modulation type, or coming from a combination of all or part of the transmissions of these waves.

It should be understood that the system of the invention is not limited to the case where the receivers are equipped only with the sole functions of reception and data processing, but that it also extends to the case where the receivers would themselves be transmitters, making possible an interrogation and optionally a dialogue with the transmitters or with other users.

Covered also by the invention is that if the four variations offered for the basic operational chart are worked out to establish a simple and fast dialogue for the majority of individuals to obtain data during their movements, the system, of course, allows other variations on the same theme and/or on professional applications and that on this operational chart more, fewer, or no colors can appear.

Thus it should be understood that the scope of the invention is defined by the contents of this disclosure in its generic sense, and that any technical ergonomic or esthetic equivalents can be implemented without thereby going outside the scope of the invention.

I claim:

1. A system for providing information to a user, comprising transmitter means for transmitting to an area for service in which said user is moving at least two predetermined frequencies of electromagnetic radiation in alternating succession, said two frequencies being absorbed by different amounts during travel of said electromagnetic radiation from said transmitter means to said user, and portable receiver means carried by said user for receiving said at least two frequencies, and for determining the distance between said transmitter means and said portable receiver means based on the difference in said absorption during transmission, said portable receiver means including (1) magnetic field detection means for determining values corresponding to at least two components of the magnetic field where said user is located, corresponding to angular orientation of said portable receiver means with respect to said magnetic field and (2) user information means for determining information to be provided to said user, said user information means including indicator means for indicating said information to said user, wherein:

said user is guided by said information indicated by said portable receiver means from his or her current position as determined by said portable receiver means to at least one of a predetermined target location and a selected target location selected by said user; and said information indicated to said user depends on said distance and angular orientation as determined by said portable receiver means.

2. The system of claim 1, said transmitter means comprising means for transmitting respective information corresponding to said information indicated by said portable receiver means to said user, on at least one predetermined one of said two predetermined frequencies and a further frequency transmitted by said transmitting means and received by said portable receiver means.

3. The system of claim 2, said respective information corresponding to said information indicated to said user being transmitted on said further transmitted frequency, said further frequency being a radio wave.

4. The system of claim 1, said portable receiver means comprising a logarithmic amplifier means for providing a distance signal corresponding to said distance between said means for transmitting and said portable receiver means, said distance signal being provided as a difference between two signals corresponding to logarithms of two respective voltage levels in said portable receiver, said two respective voltage levels respectively corresponding to strengths of said two predetermined frequencies as received and processed by said portable receiver means.

5. The system of claim 1, said transmitter means including a transmitter and a reflector, said distance determined by said portable receiver means corresponding to the distance between said reflector and said portable receiver means.

6. The system of claim 1, said transmitter means, transmitting prerecorded data, said portable receiver means comprising selection means operated by said user to selectively store a part of said prerecorded data transmitted by said transmitter, wherein said information indicated to said user depends on said stored part of said prerecorded data and said determined distance and direction.

7. The system of claim 6, at least a part of said prerecorded data repeatedly transmitted by said transmitter means being transmitted in the form of modulations of said electromagnetic radiation at said two frequencies.

8. The system of claim 7, wherein said transmitting of said two frequencies in alternating succession comprises FSK (frequency-shift keying) transmission, and said transmission of prerecorded data comprises PCM (pulse code modulation).

9. The system of claim 1, wherein said area for serivce is an area in the vicinity of the surface of the planet Earth, and said two components of the magnetic field are orthogonal horizontal components, said magnetic field detection means includes respective component means for measuring each said magnetic field component, each said component means measuring the magnetic field along a respective predetermined direction with respect to said portable receiver means.

10. The system of claim 1, wherein said portable receiver means for said determining of said distance comprises means for producing a signal in said portable receiver means with amplitude alternating proportional to the received electromagnetic radiation at said two frequencies, taking the logarithms of the two amplitudes corresponding to the received electromagnetic radiation at the two wavelengths, and determining said distance proportionaly to the difference between said two logarithms.

11. The system of claim 1, wherein said indicator means comprises visual means for indicating said information to the user.

12. The system of claim 1, wherein said indicator means comprises audio means for indicating said information to the user.

13. The system of claim 1, wherein said two different wavelengths are in the vicinity of an oxygen absorption band.

14. The system of claim 13, said oxygen absorption band being the 3-rho-sigma band at approximately 60 Ghz.

15. The system of claim 13, said oxygen absorption band being an infrared absorption band.

16. The system of claim 1, said transmitter means comprising laser means for providing said electromagnetic radiation at said two different wavelengths.

* * * * *